United States Patent [19]

Purdy

[11] 3,830,528
[45] Aug. 20, 1974

[54] QUICK DISCONNECT CONDUIT CLAMP
[75] Inventor: Michael Leonard Purdy, Stittsville, Ontario, Canada
[73] Assignee: Bell-Northern Research Ltd., Ontario, Canada
[22] Filed: July 23, 1973
[21] Appl. No.: 381,977

[52] U.S. Cl................. 285/38, 24/263 A, 285/406, 285/421
[51] Int. Cl............................................ F16l 23/00
[58] Field of Search ............ 285/38, 406, 420, 421, 285/364; 24/263 A

[56] References Cited
UNITED STATES PATENTS
3,008,150  11/1961  Lyon et al...................... 24/263 A X
3,606,391  9/1971  Sinnott............................ 285/406 X Primary Examiner—H. Hampton Hunter
Attorney, Agent, or Firm—John E. Mowle

[57] ABSTRACT

A flange member has a bearing surface for engaging a clamping surface of one flange of a pair of mating flanges. A pair of slots residing in opposite sides of the flange member are disposed above and at an angle oblique to the bearing surface. The flange member resides within a lock member and is slidably linked thereto by a pin projecting through each of the slots. A wedge resides in an opening in the flange member, above the bearing surface. An adjustable spacer means, bearing between the lock member and the wedge, urges the wedge and the pins into engagement with the other flange of the pair of mating flanges, providing three distinct areas of clamping.

5 Claims, 3 Drawing Figures

QUICK DISCONNECT CONDUIT CLAMP

This invention relates to clamps, and more particularly to clamps for quickly connecting and disconnecting flanged conduit sections without the use of tools.

The uses to which quickly connecting and disconnecting conduit clamps are put are similar in principle but may be considerably varied in application. One such application is that of clamping together flanged conduit or waveguide sections which are used in conducting radio frequency energy. One such clamp and its application is disclosed in U.S. Pat. No. 3,606,391 issued Sept. 20, 1971, and invented by J. E. Sinnott. This clamp has been used satisfactorily for some time in waveguide applications, however with the development of much higher power radio transmitters, minute leaks of the radio frequency energy at the flanged joints in a series of waveguide sections have been detected. The presently disclosed clamp is an improvement of the clamp disclosed by J. E. Sinnott and in application substantially reduces the above-mentioned leakage.

The present invention provides for interconnection of conduit sections having mating flanges with clamping surfaces. Clamping force is applied to one clamping surface and to three distinct areas of the other clamping surface. The mating flanges are thus drawn together with the clamping force being distributed substantially evenly over the mating surfaces of the mating flanges.

The present invention is a clamp for interconnecting conduit sections having mating flanges with opposed clamping surfaces. The clamp comprises a flange member residing within a lock member. The flange member includes a bearing surface engageable with one clamping surface. A pair of slots in the opposite sides of the flange member are disposed at an angle oblique to the bearing surface. The lock member includes slot engagement means projecting through the slots. The slot engagement means is slideable within the slots and engageable with the other clamping surfaces. A spacer means includes a wedge means slideably engaging the flange member and engageable with the other clamping surface. The spacer means resides between the flange member and the lock member and is adjustable to urge the slot engagement means along the slots toward the other clamping surface and to urge the wedge means toward the other clamping surface.

An example embodiment will now be described with reference to the accompanying drawings in which.

Figure 1:
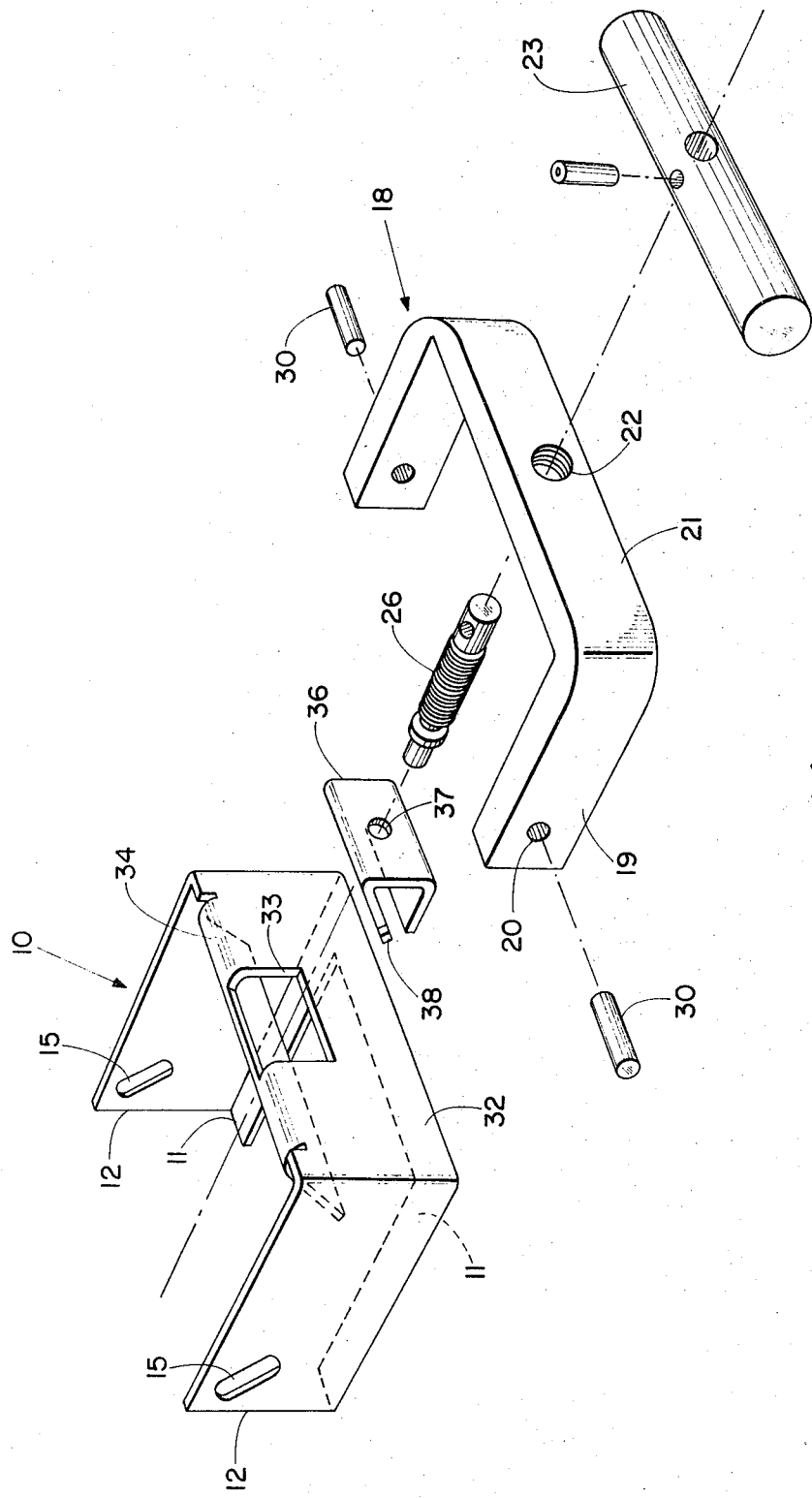
FIG. 1 is an exploded isometric view of a quick disconnect conduit clamp in accordance with the invention.
Figure 2:
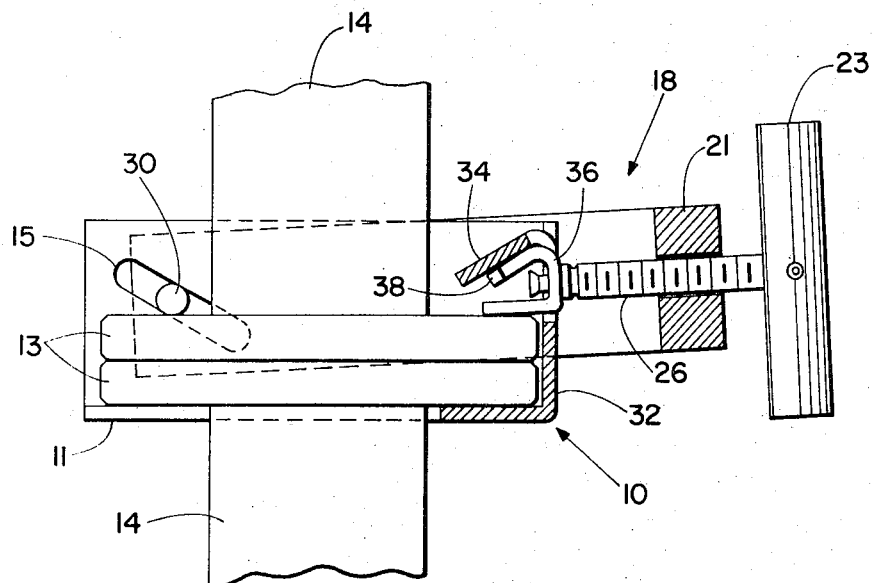
FIG. 2 is a side elevation view, in partial section, of the clamp in FIG. 1 shown clamping two waveguide flanges together.
Figure 3:
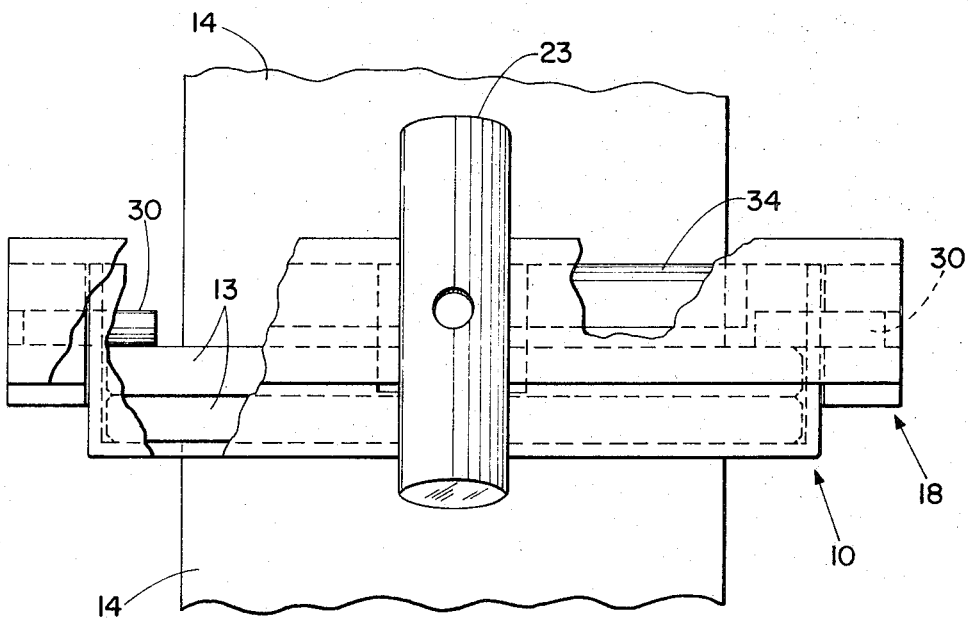
FIG. 3 is a front elevational view, showing a cut-away portion of the clamp in FIG. 1, shown clamping two waveguide flanges together.

The clamp of FIG. 1 comprises a flange member 10 having sides 12, a base 32 and a bearing surface 11 that is formed by a turned-in portion of the sides 12 and the base 32. It will be seen that the flange member 10 is shaped in the form of a U in order to engage a pair of mated flanges 13 of a waveguide 14 which is illustrated in FIGS. 2 and 3. The sides 12 have slots 15 formed therein which are disposed obliquely relative to the bearing surface 11. The flange member 10 includes a captive rectangular slot 33, in the base portion 32. The edge of the base portion 32 carries an inclined flange 34. The angle of inclination being oblique to the bearing surface 11 and generally opposite to that of the slots 15. A wedge member 36 including base, upright and inclined portions and in cross-section approximates a right angle triangle. The inclined portion or hypotenuse, is of similar inclination to that of the flange 34. The upright portion of the wedge 36 includes a captive hole 37 which receives one end of a screw 26. The wedge member 36 fits into the slot 33 and is loosely retained between the flange 34 and the base portion 32 by a pair of protrudances 38 extending laterally from each end and adjacent the edge of the wedge member 36. A lock member 18 is provided to engage the flange member 10 and includes two sides 19 which slideably engage the corresponding sides 12 of the flange member 10. In the complete assembly of the clamp unit illustrated in FIGS. 1, 2 and 3, the sides 12 and 19, which correspond, are engaged in a position which allows a pair of holes 20, that are located at the ends of the sides 19, to coincide with some portions of the slots 15. In the lock member 18, a third side 21 includes a threaded hole 22 which when the flange member 10 and the lock member 18 are placed together, coincides with the approximate center of the hole 37. The remaining structure of the clamp of FIG. 1 consists of a slot engagement means in the form of cylindrical pins 30 residing in the holes 20. Each pin 30 engages a corresponding slot 15. Of course any suitable engagement means, for example that shown in FIG. 1 of J. E. Sinnott's patent, may be used.

It may be seen from FIGS. 1 and 2 that the screw 26 has one end which is not threaded and which is reduced in diameter so as to fit through the captive hole 37 where it is retained. The screw 26 may be retained in the hole 37 by any convenient means, for example by peening the tip of the reduced diameter portion to enlarge it. The threaded portion of the screw 26 engages the threaded hole 22. The other end of the screw 26 is fitted with a handle or knob 23 to facilitate adjustment.

Separation of the lock member 18 from the flange member 10 occurs by rotation of the screw 26. The pins 30 are pulled down the slots 15 and against a clamping surface of one of the flanges 13. This causes both flanges 13 to be trapped and clamped between each pin 30 and the bearing surface 11 providing two clamping areas, as shown in FIGS. 2 and 3. At the same time the wedge member 36 is forced down the inclined plane or flange 34 and against the clamping surface of said one flange 13 as a result of pressure exerted by the screw 26. This causes both flanges 13 to be trapped and clamped between the wedge member 36 and the bearing surface 11, providing a third clamping area, as shown in FIGS. 2 and 3.

The wedge member 34 and inclined plane may be alternately replaced by any structure which will derive the required wedging action when forcefully actuated by the screw 26. One alternative may include a partial conical section as part of the inclined flange 34 which cooperates with a conically shaped tip of the screw 26. The required clamping force in this case is applied directly between the conical tip and the bearing surface 11.

What is claimed is:

1. A clamp for interconnecting conduit sections having mating flanges with opposed clamping surfaces, the clamp comprising:

a flange member and a lock member, said flange member residing within said lock member, said flange member including a bearing surface engageable with one clamping surface and including a pair of slots in opposite sides of the flange member, the slots being disposed at an angle oblique to the bearing surface and a downwardly inclined plane member extending at an angle substantially opposite to the first mentioned angle on the end of said flange member;

said lock member including slot engagement means slideable in and projecting through the slots, and engageable with the other clamping surface;

a spacer means including wedge means slideably engaging the downwardly inclined plane member and engageable with the other clamping surface, the spacer means residing between the lock member and the flange member, and adjustable means interconnecting said spacer means, said flange member and said lock member to adjust said flange member and said lock member relative to each other whereby to urge the slot engagement means along the slots toward the other clamping surface and to urge the wedge means toward the other clamping surface upon operation of said adjustable means.

2. A clamp as defined in claim 1 in which the downwardly inclined plane member includes an incline plane means with which the wedge means is slieably engageable.

3. A clamp as defined in claim 1 in which the flange member includes a captive opening adjacent the downwardly inclined plane member having an angle of inclination generally greater than the angle of inclination of the slots, said wedge means substantially residing within the captive opening and slideably engageable with the inclined plane member.

4. A clamp as defined in claim 3 in which the wedge means in cross-section generally defines a right angle triangle, the hypotenuse of which is slideably engageable with the incline plane member, the wedge means also including a pair of lateral projections adjacent the end of the hypotenuse remote from said lock member and extending beyond opposite sides of the captive opening to loosely retain the wedge means.

5. A clamp as defined in claim 3 in which the angle of inclination of the slots and of the incline plane member is about 30° and 45° respectively with respect to the bearing surface.

* * * * *